Feb. 9, 1926.

H. M. LAMBERT

MOLD FOR MANUFACTURING TIRES

Original Filed July 3, 1924    2 Sheets-Sheet 1

1,572,440

INVENTOR
H. M. Lambert.
BY
ATTORNEY

Feb. 9, 1926. 1,572,440
H. M. LAMBERT
MOLD FOR MANUFACTURING TIRES
Original Filed July 3, 1924   2 Sheets-Sheet 2
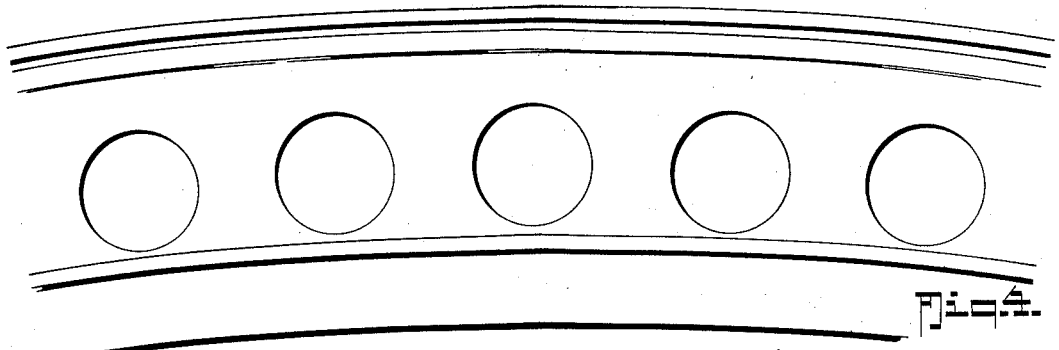
Fig. 4.
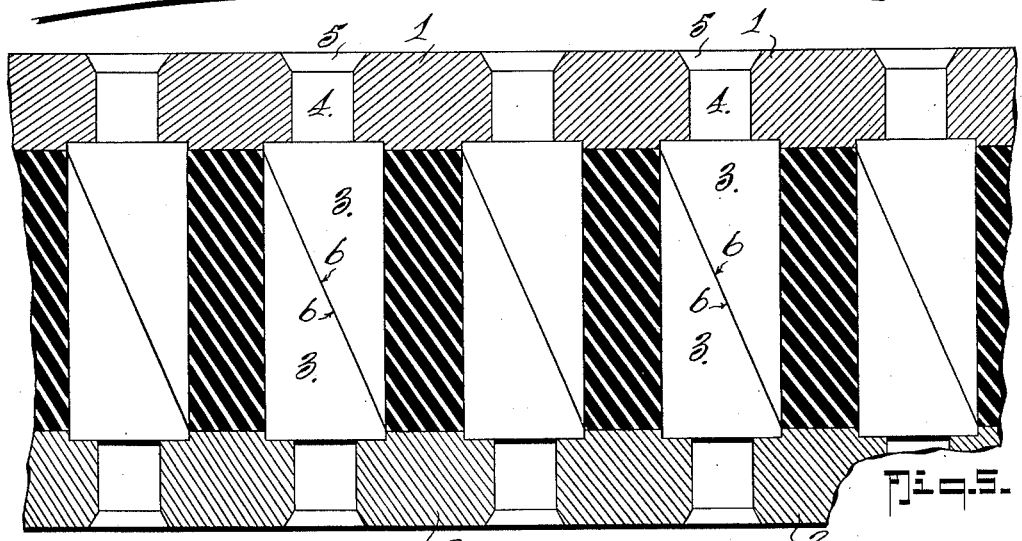
Fig. 5.
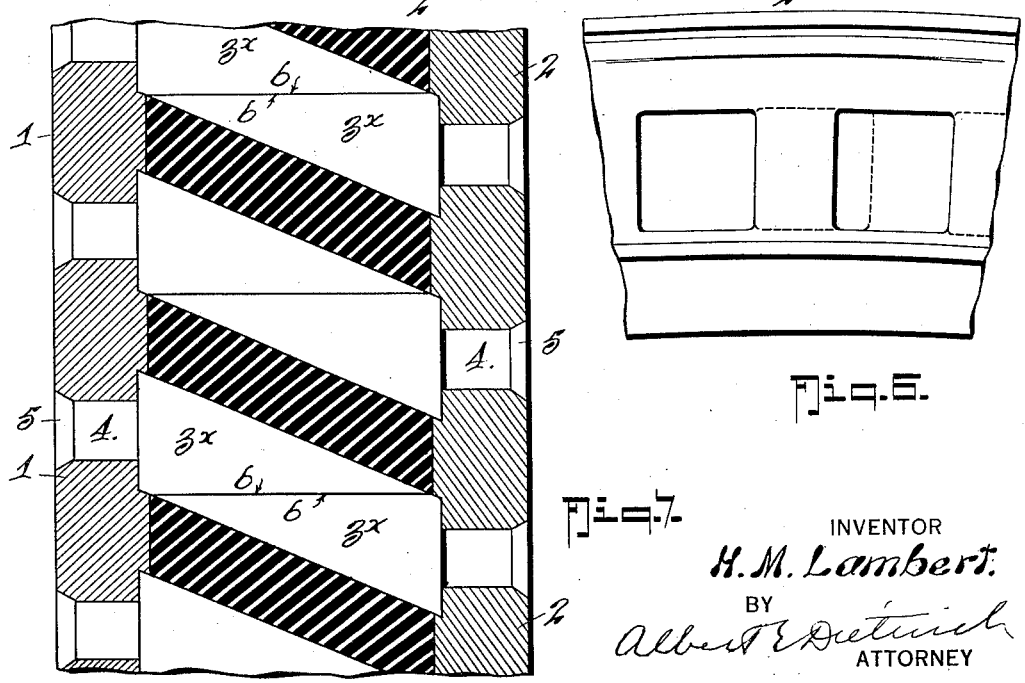
Fig. 6.
Fig. 7.
INVENTOR
H. M. Lambert.
BY
Albert E Dietrich
ATTORNEY Patented Feb. 9, 1926.

1,572,440

UNITED STATES PATENT OFFICE.

HENRY M. LAMBERT, OF PORTLAND, OREGON, ASSIGNOR TO LAMBERT TIRE & RUBBER CO., OF AKRON, OHIO, A CORPORATION OF ARIZONA.

MOLD FOR MANUFACTURING TIRES.

Application filed July 3, 1924, Serial No. 724,110. Renewed July 13, 1925.

*To all whom it may concern:*

Be it known that I, HENRY M. LAMBERT, a citizen of the United States, residing at Portland, in the county of Multnomah and State of Oregon, have invented certain new and useful Improvements in Molds for Manufacturing Tires, of which the following is a specification.

My invention, which relates to the art of tire manufacture, has for its object to provide certain new and useful improvements in tire molds which are adapted for making cushion tires with holes through the same and particularly those tires in which the holes pass transversely through from side to side in a diagonal direction instead of straight across. While my invention is especially designed for the making of diagonal hole tires it may also be employed in the manufacture of straight hole tires.

Heretofore in making cushion tires, especially those having the holes passing through the same diagonally or on the bias, much difficulty has been encountered in connection with their manufacture owing to the expense of mold construction and the difficulty of removing the mold pins or cores from the tire carcass. It is to overcome these difficulties that my invention has been especially designed.

In the general or broad aspect, the present invention resides in providing a mold with the usual side plates and tread portion, etc., and with hole establishing pins but in the present case the construction of the hole establishing pins is such that they may be easily withdrawn from the tire after vulcanization; to that end I make the pins in two symmetrical halves, one matching the other, the plane of division between the two sections lying at an incline to the longitudinal axis of the pin as a whole and preferably extending from one side plate to the other side plate across the full width of the mold cavity.

More subordinately, the invention includes those novel details of construction, combination and arrangement of parts, all of which will be first fully described, then be specifically pointed out in the appended claims and illustrated in the accompanying drawings, in which:—

Figure 4 is a side elevation of a tire section embodying the invention.

Figure 5 is a view similar to Figure 2 of a modification of the mold in which the axes of the pins extend straight across the mold cavity and lying normal to the sides of the mold.

Figure 6 is a detail side elevation of a modified construction of tire in which the holes instead of being of circular cross section are of rectangular cross section.

Figure 7 is a view similar to Figure 2 showing the mold in which the tire section of Figure 6 is made. In this figure, (Figure 7) the core pins are shown in plan while the mold and tire are shown in section.

Figure 1:
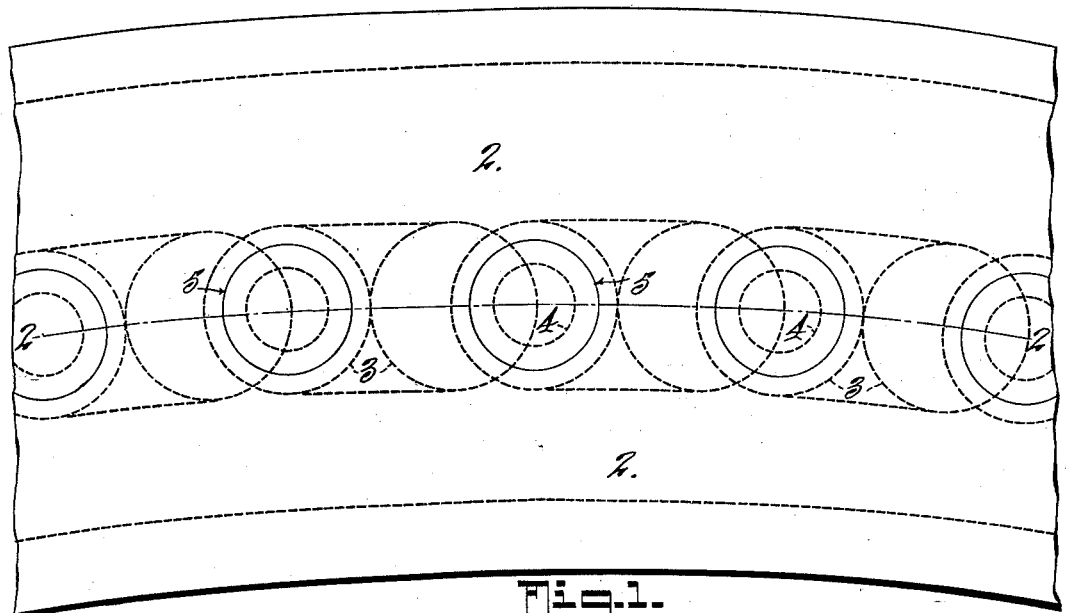
Figure 1 is a side elevation of a mold having one embodiment of my invention.
Figure 2:
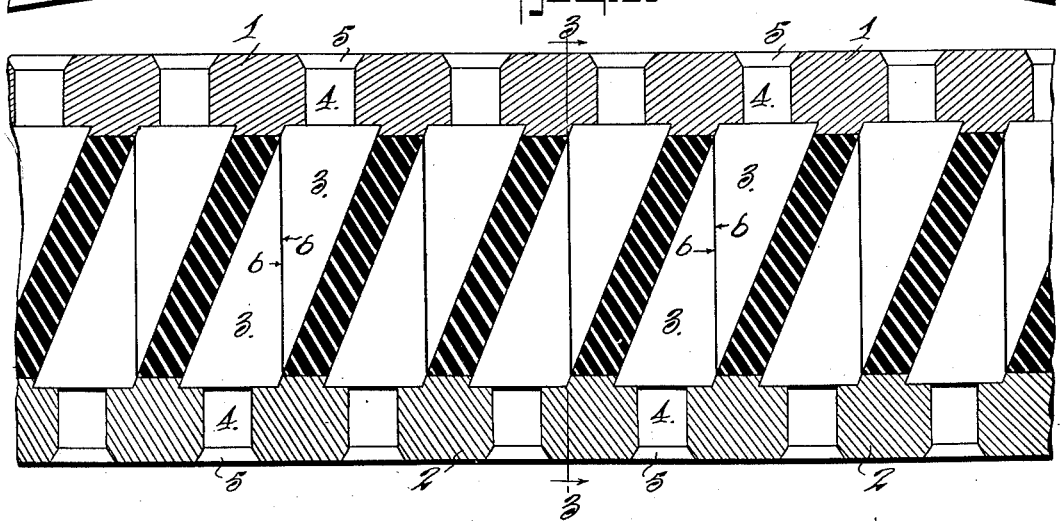
Figure 2 is a developed horizontal section on the line 2—2 of Figure 1, the pins, however, being shown in plan.
Figure 3:
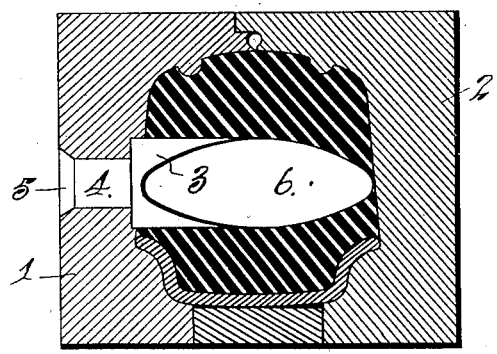
Figure 3 is a cross section on the line 3—3 of Figure 2.

In the drawings, in which like numerals of reference indicate like parts in all of the figures, 1 and 2 designate the side plates of the mold which may be of the usual construction. 3—3 designate the pins which may be of any desired cross sectional shape, preferably circular as shown in Figures 1 to 5, or rectangular, as shown in Figures 6 and 7. Each pin consists of two halves 3—3 separated by a divisional plane 6 which lies normal to the sides of the mold but inclined with relation to the longitudinal axis of the pin when diagonal holes are to be made or when the holes are to go straight across then the divisional plane 6 (see Figure 5) while still inclined to the axis of the pin, as a whole, is nevertheless inclined to the sides of the mold.

When the mold is provided with pins 3 of circular cross section, (see Figures 1 to 3, inclusive) and the pins are arranged on the tires as there shown, in separating the plates 1 and 2 they are pulled laterally apart and given a slight turn on their axes at the same time to free the pin sections 3—3 from the tire. When, however, the pins are arranged to go straight through the tire, as shown in Figure 5, the mold plates 1 and 2 may be separated by direct pulls laterally without turning on the axis; also when the pins are of rectangular cross section, as shown in Figure 7, the pull may be straight across without the necessity of turning the side plates on their axes.

It will also be noted that the various pin sections 3—3, 3×—3× (3× indicating the square-section pins Figure 7) have studs 4 which pass through the side plates and are riveted over as at 5 to secure the pins to the side plates. This is a preferable construction as it enables the pins to be withdrawn with the side plates by one operation.

From the foregoing description, taken in connection with the accompanying drawings, it is thought the construction of my molds and their manner of use and many advantages will be readily apparent to those skilled in the art.

What I claim is:

1. A tire mold comprising side plates, hole establishing pins extended from one side plate to the other across the width of the mold chamber, each pin comprising two matching sections, the plane of division between which sections lies at an inclination to the longitudinal axis of the pin.

2. A tire mold comprising side plates, hole establishing pins extended from one side plate to the other across the width of the mold chamber, each pin comprising two matching sections, the plane of division between which section lies at an inclination to the longitudinal axis of the pin, and normal to the face of the side plates.

3. In tire molds the combination with the side plates, of pins extending from one side plate diagonally across to the other side plate, each of said pins comprising two symmetrical matching sections, one secured to one side plate and the other secured to the other side plate with their planes of division lying at an inclination to the longitudinal axis of the pin as a whole.

HENRY M. LAMBERT.